July 23, 1929.  J. D. McCUTCHEON  1,721,569
CUTTING TORCH
Filed Nov. 11, 1927   2 Sheets-Sheet 1
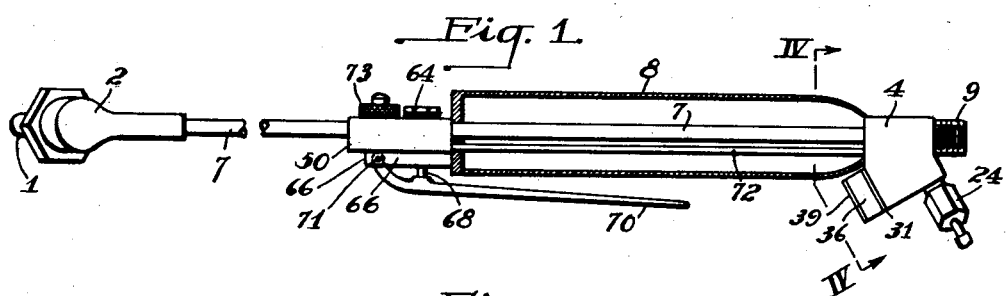
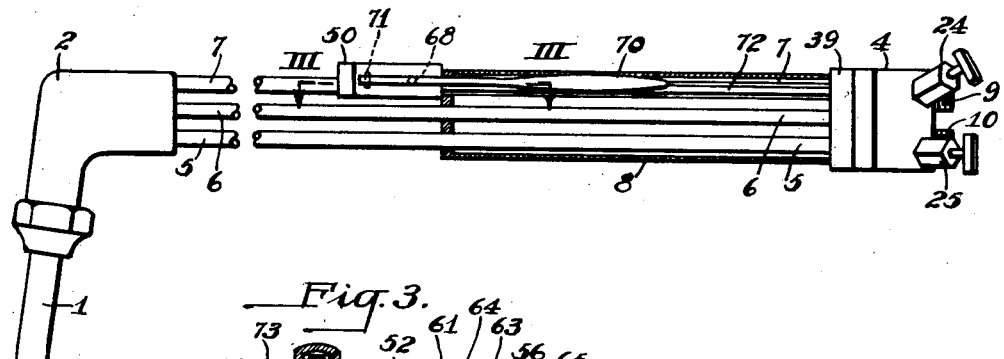
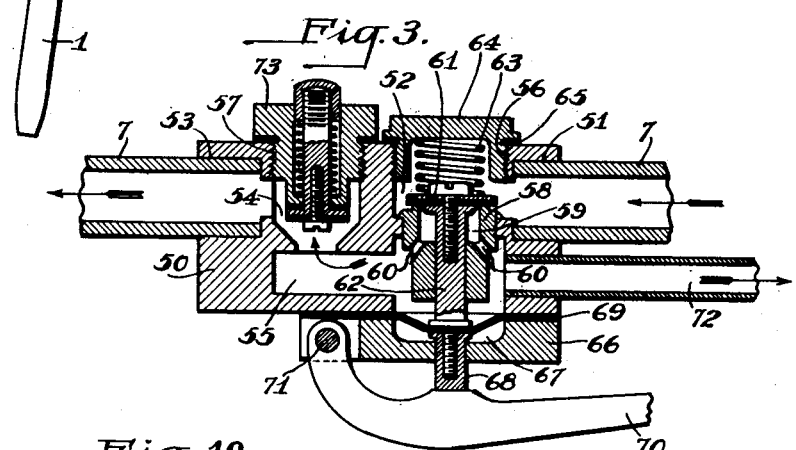
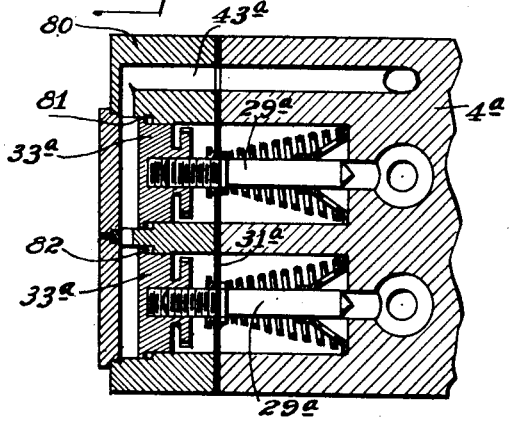
INVENTOR
James D. McCutcheon
By Brown & Critchlow
his Attorneys July 23, 1929.  J. D. McCUTCHEON  1,721,569
CUTTING TORCH
Filed Nov. 11, 1927   2 Sheets-Sheet 2

INVENTOR
James D. McCutcheon
By Brown & Critchlow
his Attorneys.

Patented July 23, 1929.

1,721,569

UNITED STATES PATENT OFFICE.

JAMES D. McCUTCHEON, OF PITTSBURGH, PENNSYLVANIA.

CUTTING TORCH.

Application filed November 11, 1927. Serial No. 232,530.

The invention relates to torches, and especially to cutting and welding torches adapted to deliver heating and cutting jets.

The primary object of the invention is to provide such a torch with fluid-pressure operated means for reducing the heating jet when the cutting jet is formed.

Another object is to provide means operable by the pressure of the cutting gas to coordinate reduction of the heating jet with formation of the cutting jet.

Among other objects, it is the purpose of the invention to provide a cutting torch which is compact, easy to construct, efficient and economical in use with any gases used in cutting, and readily manipulated.

Figure 4:
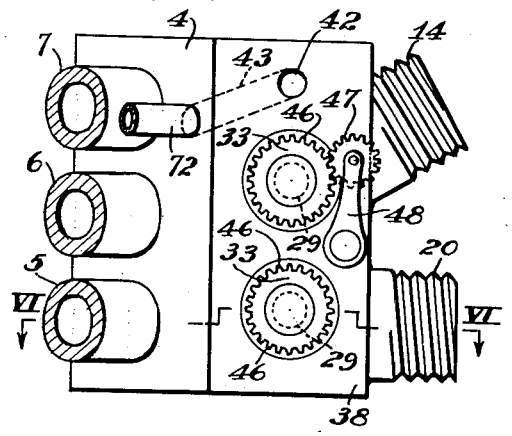
Figure 5:
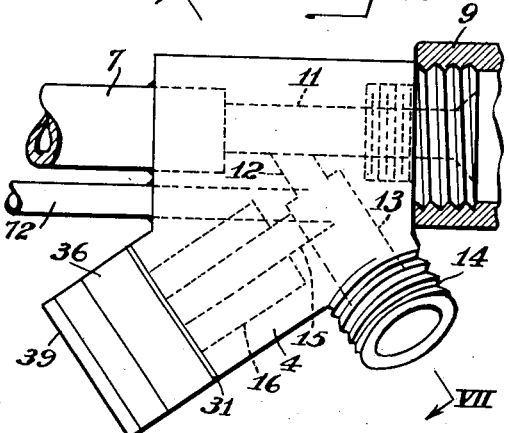
Figure 6:
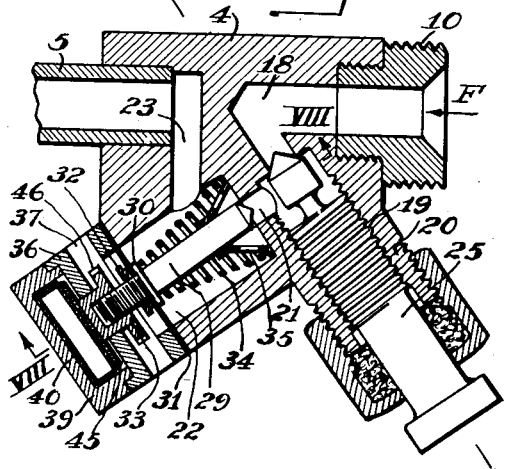
Figure 7:
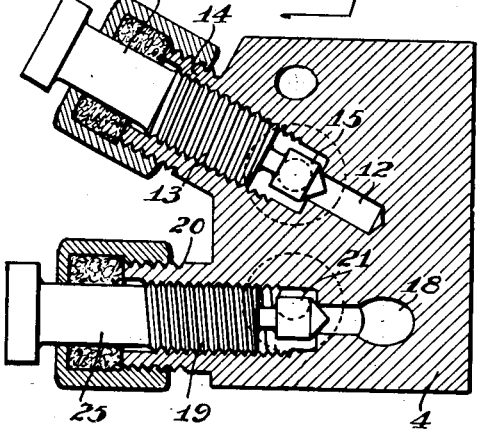
Figure 8:
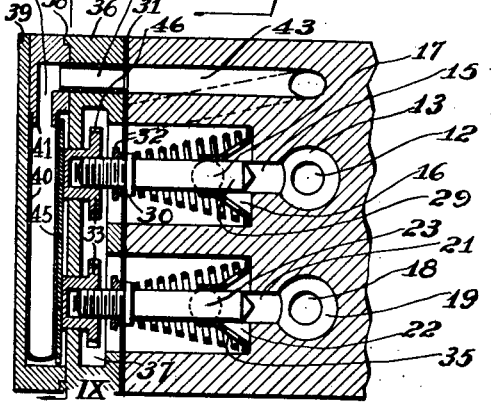
Figure 9:
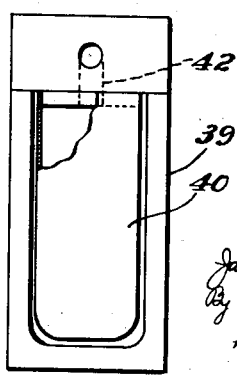

An illustrative embodiment of the invention is shown in the accompanying drawings, in which Fig. 1 is a plan view partly in section of a torch constructed according to the invention; Fig. 2 a side view of the torch shown in Fig. 1; Fig. 3 a sectional view of the cutting gas control mechanism taken on line III—III, Fig. 2; Fig. 4 an end view of the base valve block, taken on line IV—IV, Fig. 1; Fig. 5 a side view of the base valve block; Fig. 6 a sectional view of the base valve block and heating jet control valve mechanism, taken on line VI—VI, Fig. 4; Fig. 7 a sectional view on line VII—VII of Figs. 5 and 6; Fig. 8 a section on line VIII—VIII, Fig. 6; Fig. 9 a view of the fluid-pressure transmitting means taken on line IX—IX, Fig. 8; and Fig. 10 a view similar to Fig. 8 showing a modification of the valve-operating means.

In its preferred embodiment the torch comprises an ordinary cutting torch nozzle adapted to deliver heating and cutting jets, a base valve block, connections between the nozzle and base for supplying heating and cutting gases to the nozzle, and auxiliary spring-impelled valves disposed in the base to control the heating gas supply. A valve normally held in closed position by a spring controls the cutting gas supply. Fluid pressure mechanism is interposed between this valve and the heating gas control valves, which is adapted automatically to reduce or shut off the supply of heating gas when the pressure of the cutting gas is communicated to it upon opening the cutting gas valve.

Referring to the drawings, the torch there shown comprises a nozzle 1 and head 2. The head illustrated is provided with a mixing chamber, but the invention is equally applicable to other types, such as those employing the injector principle. All of these nozzles and heads are in common use with cutting torches, and being well known to the art, require no further description. Connected to the head and extending to a base valve block 4 are three pipes 5, 6 and 7, the first two of which supply gases for the heating jet, and the last, 7, supplies the gas for the cutting jet. A tubular or coiled wire handle member 8 is disposed about the pipes adjacent to the base. Two nipples 9 and 10 disposed on base valve block 4 provide for connection to a source of cutting gas, and to a source of fuel gas respectively. The cutting gas passes to pipe 7 through a duct 11, Fig. 5, which communicates with nipple 9.

In the type of torch illustrated, the heating jet is formed from a mixture of fuel gas and low pressure cutting gas. Cutting gas for the heating jet is drawn from duct 11 through a side duct 12, Fig. 5, enlarged and interiorly threaded at 13, and having an exteriorly threaded projection or nipple 14. A side duct 15 leads from chamber 13 to an auxiliary valve chamber 16, from which another duct 17, Fig. 8, leads to pipe 6. Similarly, fuel gas is supplied through nipple 10, and duct 18, Fig. 6, which is enlarged and threaded at 19, from which it passes through duct 21 to an auxiliary valve chamber 22, and thence to another duct 23, which leads to pipe 5. Chamber 19 extends through an exteriorly threaded nipple 20.

Primary heating control valves 24 and 25, Figs. 1, 2, and 7 are disposed in nipples 14 and 20, respectively, in order to provide for setting of the desired amount and proportion of the gases which make up the heating jets. These valves are identical in construction, and as shown in Figs. 6 and 7 are of a type commonly used with cutting torches to set the flow of gases through the heating jets.

The automatic control mechanism provided according to the invention, by which the heating jet is reduced when the cutting jet is formed, is disposed in auxiliary valve chambers 16 and 22. These valves are identical in construction, and are spring-impelled to normally permit passage of heating gases to the nozzles, but are operable simultaneously in response to fluid pressure to reduce the flow of heating gases, or to stop it entirely. These valves, as shown in Figs. 6 and 8, comprise a valve stem 29, the inner end of which is conical and seats in the duct leading into the chamber. Intermediate its ends, the stem is provided with a collar 30, and a diaphragm packing 31 rests on the outer face of this collar and is held in place tightly above valve stem 29 by a threaded collar 32, which engages threads cut in the outer end of stem 29. A threaded shouldered bushing 33 is disposed on the outer end of stem 29. The stems are disposed in chambers 16 and 22 in such a manner that the conical ends seat in the ducts 15 and 21 and a coiled spring 34 disposed in each chamber with its outer end bearing against collar 30 normally urges the valve stem outwardly to its open passage position. The inner end of the spring engages a valve stem guide 35. Diaphragm-gasket 31 is of such size as to engage the shoulders surrounding the valve chambers in base valve block 4, as shown in Figs. 5, 6, and 8, to make a pressure-tight joint between the block and a plate 36 which is secured thereto in any suitable manner. This plate is bored out to form a chamber 37, and through its lower and upper faces are openings adapted to receive the valve stem and bushings, as seen in Figs. 6 and 8, thus permitting free stem movements therein. A recessed portion 38 in the upper face of plate 36 is provided for reception of another plate 39, which is hollowed out to receive an expansion sack 40, closed at one end, the other end fitting over a nipple 41, Fig. 8, provided at the end of a duct 42 formed in the plate. When plate 39 is set in place, this duct aligns with a duct 43, Figs. 4, 7 and 8, in base valve block 4, and communication is established therebetween by duct 44 in plate 36. The inner face of plate 39 is recessed to receive a loosely fitting metal plate or floating diaphragm member 45, Fig. 6, which bears on bushings 33 when fluid pressure expands sack 40.

Bushings 33 are intended not only to act as pistons for stems 29, but also to provide a convenient and ready means of adjusting the valve opening. This is accomplished by providing teeth 46 on the bushings, as shown in Figs. 4 and 6, which are engaged by teeth formed on a pinion 47, Fig. 4, carried by an arm 48 pivotally mounted between the bushings 43 in a slot cut for that purpose in plate 36. In order to set these valves, the arm 48 is thrown to engage the teeth of pinion 47 with the teeth cut in the bushing, whereupon by rotation of pinion 47 in one direction or another the stem is moved to vary the distance between the bushing and collar 30, thus making it possible to alter the effective length of the stems, and thereby to regulate the flow of heating gases when the valve is actuated by operation of the cutting jet, as hereinafter described. In some cases, as for example when an injector is used, it may be desirable or necessary to render one of these valves inoperable to shut off or reduce the flow of gas, and in such cases it is necessary only to set the stem in the manner just described, so that it has the shortest effective stem length, when it will be incapable of closing the valve orifice when the cutting gas valve is operated.

In order to actuate the auxiliary valves controlling the heating jet, the invention provides means associated with the cutting gas control valve for applying the pressure of that gas to the heating gas valve-controlling mechanism when the cutting gas valve is opened.

Referring to Fig. 3, the cutting gas control valve comprises a block 50 provided at one end with a short longitudinal recess 51 which opens into a transverse opening 52 extending entirely through the block, and another longitudinal recess 53 in the other end opens into a chamber 54 parallel to 52 and communicating therewith by a bore 55. The upper ends of openings 52 and 54 are threaded at 56 and 57 respectively. A valve seat block 58 having a recess 59 and a plurality of radial passages 60 is disposed on shoulders formed in opening 52, and the upper end is formed to provide a seat for a valve head 61, whose stem 62 passes through block 58 and extends through the lower end of opening 52. The valve is normally held in its passage-closing position, as shown in Fig. 3, by the cutting gas pressure and by a spring 63, one end of which bears against the valve head, and the other against a plug 64 which engages threads 56. A suitable gasket 65 is interposed between the plug and block 50. A plate 66 recessed at 67 and provided with a bore to receive a movable pin 68 is secured to block 50 with pin 68 aligned with valve stem 62, and a pressure-tight joint is formed by means of a diaphragm gasket 69. A trigger 70 adapted to move pin 68 is pivotally connected at 71 to plate 66. This valve is interposed in cutting gas pipe 7, as shown in Figs. 1 and 3. Spring 63 normally holds the valve head against its seat, preventing any flow of cutting gas. When trigger 70 is depressed, pin 68 acts upon valve stem 62, and if the trigger is moved sufficiently the valve is forced open, when cutting gas passes through the radial openings 60 in block 58, into bore 55 and thence through chamber 54 through pipe 7 to the nozzle. At the same time, the cutting gas enters a smaller pipe 72, which leads from bore 55 to duct 43 in the base valve block, and since this duct is connected to pressure sack 40, the pressure of the cutting gas will cause sack 40 to expand. This expansion can be relieved only by movement of the plate or diaphragm 45, which acts upon bushings 33 to cause valve stems 29 to move toward their seats, reducing or shutting off entirely the heating jet gas supply, depending upon the adjustment. When trigger 70 is released, spring 63 will force the cutting gas valve to close, shutting off the flow of cutting gas, and the pressure on the sack will be relieved, thereby permitting springs 34 to open the valves and to again supply gas for the heating jet.

A regulating device indicated generally by the numeral 73 is screwed into threads 57 in chamber 54, by which it is possible to regulate the amount of cutting gas passing to the nozzle when valve 61 is opened.

In the operation of this torch a source of cutting gas is connected to nipple 9, and a fuel gas connection is made at nipple 10. Oxygen is generally used as the cutting gas, and any one of the commercial fuel gases can be used, such as acetylene, but other gases known to the art can be used when desired. The heating gas is a mixture of a suitable fuel gas and oxygen or an oxygen-containing gas. The cutting gas valve is normally closed, so that this gas cannot flow to the nozzle until the valve is manipulated. The operator first makes primary adjustment of valves 24 and 25, which regulate the low pressure cutting gas and fuel gas respectively, to give the heating jet required for the particular work in hand, these gases flowing through the various ducts and valves as previously described, and to the head and nozzle through pipes 5 and 6. When the work has been heated sufficiently, the operator presses on trigger 70, which opens valve 61 and forms the cutting jet. Simultaneously the cutting gas pressure is transmitted to the heating gas valve-control mechanism, and the valves are actuated in the manner hereinbefore described, whereby the heating jet can be automatically reduced or even shut off. If the operator wishes more or less heating jet at this time, the heating gas valves 29 are adjusted through the pinion 47. When the operator has finished the cutting operation he releases the trigger, whereupon the cutting jet is shut off thereby removing the pressure on sack 40, and the heating jet simultaneously and automatically renewed.

Fig. 10 illustrates a modification of the valve-control mechanism which dispenses with the pressure sack. In this modification and construction of base valve blocks 4ª and auxiliary valves 29ª is the same as before, but the pressure-transmitting means comprises a single plate 80 provided with a pressure-transmitting duct 43ª, as before. This plate is bored out at 81 to form shouldered openings therethrough. Bushings 33ª provided with shoulders on the outer ends are connected to valve stems 29ª, and move in these openings, and act as pistons to operate the valves when pressure is supplied through duct 43ª. A diaphragm gasket 31ª disposed between the block and plate prevents loss of gases. The bushings 33ª are adjustable in the same manner as above described to regulate the reduced size of the heating jet, rotation of the bushings regulating the effective length of valve stems 29ª which in turn determines the valve openings when the bushings are at shoulders 82.

Thus, the invention provides a compact and easily operated torch, which is quickly and easily adjustable to meet varying conditions, and which automatically reduces the flow of gases in the heating jets when the cutting jet is formed. The positive and immediate control of the heating jet together with the flexibility of adjustment effects a very substantial gas economy as compared with other prior torches, because the reduced size of the heating jet is easily adjustable and it is automatically reduced upon forming the cutting jet.

According to the provisions of the patent statutes, I have explained the principle and mode of operation of my invention, and have illustrated what I now consider to be its best embodiments. However, I desire to have it understood that, within the scope of the appended claims, the invention may be practiced otherwise than as specifically described.

I claim:

1. The combination with a torch comprising a nozzle, and means for separately supplying thereto heating gas and cutting gas; of fluid-pressure actuated means for reducing the supply of heating gas when cutting gas is supplied to the nozzle.

2. The combination with a torch comprising a nozzle adapted to deliver heating and cutting jets, conduits for separately supplying heating and cutting gas to said nozzle, and oppositely acting cutting and heating gas control valves disposed in said conduits; of fluid pressure actuated means associated with said valves to reduce the heating jet when the cutting jet is formed.

3. A torch comprising a nozzle adapted to deliver heating and cutting jets, pipes for supplying heating gas and cutting gas to said nozzle, separate valves disposed in said pipes for controlling the heating and cutting gas supplies, and means acting on the heating gas control valves operable by the pressure of the cutting gas to reduce the heating gas supply when the cutting gas is supplied to the nozzle.

4. A torch comprising a nozzle adapted to deliver heating and cutting jets, pipes connected to said nozzle for separately supplying heating and cutting gas to said nozzle, a spring-actuated valve disposed in the cutting gas pipe, valve-control mechanism for regulating the supply of heating gas, a conduit extending from the outlet of said cutting gas valve to said heating gas valve control mechanism, whereby to reduce the heating jet when the cutting gas valve is opened.

5. A torch comprising a nozzle adapted to deliver heating and cutting jets, a valve block disposed in spaced relation to said nozzle, three supply pipes connecting said block and nozzle, one of said pipes supplying cutting gas under high pressure and the other two supplying heating gas, a normally closed spring-actuated valve in said cutting gas pipe, regulating valves in said valve block for controlling the supply of heating gas, expansible means for transmitting pressure to said heating gas valves, and a connection extending from the outlet of said cutting gas valve to said expansible means, whereby to reduce the supply of heating gas when the cutting gas valve is opened.

In testimony whereof, I sign my name.

JAMES D. McCUTCHEON.